C. A. FRENCH.
PIANO-TRUCK.
No. 171,657. Patented Jan. 4, 1876.
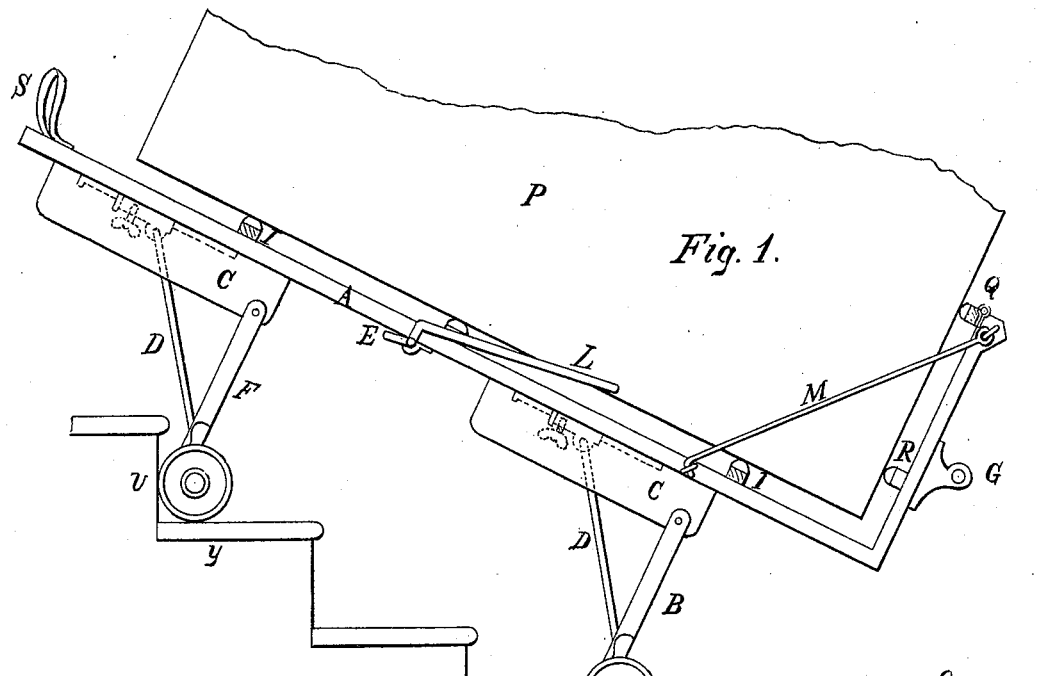
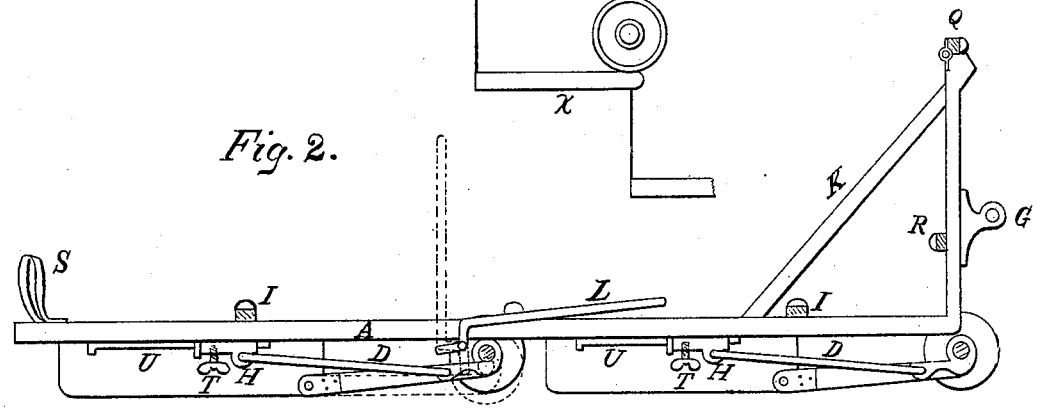
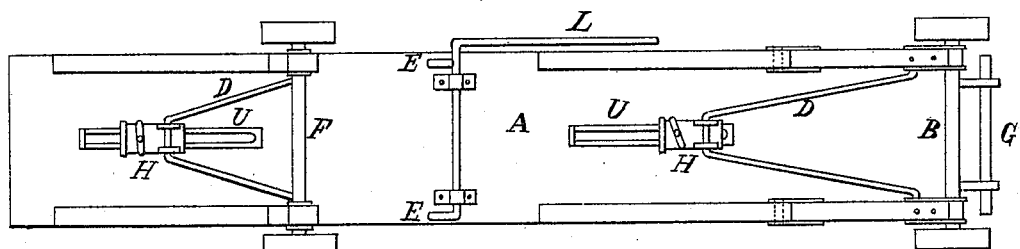
Witnesses.
W. A. Austin
A. D. Willey
Inventor.
Chas. A. French

UNITED STATES PATENT OFFICE.

CHARLES A. FRENCH, OF DAVENPORT, IOWA.

IMPROVEMENT IN PIANO-TRUCKS.

Specification forming part of Letters Patent No. 171,657, dated January 4, 1876; application filed September 6, 1875.

*To all whom it may concern:*

Be it known that I, CHARLES A. FRENCH, of Davenport, county of Scott and State of Iowa, have invented a new and useful Improvement in Piano-Trucks, which improvement is fully set forth in the following specifications, reference being had to the accompanying drawings.

The object of my invention is to rapidly handle pianos in safety, and without injury, by the combination, in a piano-truck, of the adjustable hinged truck B F, and adjustable sliding braces D D for adjusting the trucks at any desired position, thus varying the distance between the axles for the variation of the different stairs, also the rocker-shaft L, with cams E for elevating the truck on the wheels, as shown in the plan view, Fig. 1, of the accompanying drawings.

The machine is illustrated more in detail in plan view, Fig. 3, and in the vertical section, Fig. 2. The piano rests on cushions I I, and is held erect by the end piece R, and brace K, and hooks *m*. Said hook is made to unfasten to turn the piano on or off the truck. The trucks B F are hinged to the bed A A C in such a manner that they can be swung far enough either way to adjust the trucks for the variation of the grade or run of different stairs, so that while the truck B is rolling on the stair *x* the truck F is being raised to the stair *v*, and are secured at any desired position by the sliding braces D D, one end of which is secured to the truck B F, and the other end to the sliding heads H H, which slide on the truck W W, and secure the truck at any desired position. The rock-shaft L has cams E E, which, when turned by the rock-shaft L, come in contact with the truck F, and force the wheels to position of dotted lines, thus elevating the trucks on the wheels.

It will be evident that the trucks may be hinged to the bed at any position in the length thereof, so as to adjust for any stair, and also be made to swing either or opposite ways; also the cams on the lever L may be of any desired length to elevate the truck to any desired height.

I do not claim the hinging of the truck to the bed.

I claim—

1. The combination, in a piano-truck, substantially as and for the purpose set forth, of the adjustable hinged truck, sliding braces, sliding heads, H H, and track *u u*, for adjusting at any position, thus varying the distance between the axles, for the variation of different stairs.

2. The combination, in a piano-truck, substantially as and for the purpose set forth, of the rocker-shaft, in combination with the cams for elevating the truck on the wheels.

CHAS. A. FRENCH.

Witnesses:
 L. R. DOSH,
 FRANK P. LEFFINGWELL.